US010682212B2

(12) United States Patent
Taniguchi

(10) Patent No.: US 10,682,212 B2
(45) Date of Patent: Jun. 16, 2020

(54) ELECTRIC TOOTHBRUSH

(71) Applicant: PANASONIC INTELLECTUAL PROPERTY MANAGEMENT CO., LTD., Osaka (JP)

(72) Inventor: Shinichi Taniguchi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 7 days.

(21) Appl. No.: 15/957,581

(22) Filed: Apr. 19, 2018

(65) Prior Publication Data

US 2018/0333240 A1 Nov. 22, 2018

(30) Foreign Application Priority Data

May 18, 2017 (JP) ................... 2017-098740

(51) Int. Cl.
A61C 17/34 (2006.01)
A61C 17/22 (2006.01)
A61C 17/26 (2006.01)
A61C 17/40 (2006.01)

(52) U.S. Cl.
CPC .......... A61C 17/3472 (2013.01); A61C 17/26 (2013.01); A61C 17/3481 (2013.01); *A61C 17/22* (2013.01); *A61C 17/3418* (2013.01); *A61C 17/3445* (2013.01); *A61C 17/40* (2013.01)

(58) Field of Classification Search
CPC ....... A61C 17/22; A61C 17/222; A61C 17/34; A61C 17/3481
See application file for complete search history.

(56) References Cited

U.S. PATENT DOCUMENTS

| 3,927,434 A * | 12/1975 | Burgess ................. A46B 13/06 15/24 |
| 5,226,206 A | 7/1993 | Davidovitz et al. |
| 2003/0162146 A1* | 8/2003 | Shortt .................... A61C 17/34 433/118 |
| 2005/0235438 A1 | 10/2005 | Motohashi et al. |
| 2005/0255427 A1* | 11/2005 | Shortt .................... A61C 17/22 433/118 |
| 2007/0145832 A1* | 6/2007 | Shimizu ................. H02K 33/06 310/15 |

(Continued)

FOREIGN PATENT DOCUMENTS

JP 4218413 B2 2/2009

OTHER PUBLICATIONS

The Extended European Search Report dated Oct. 17, 2018 for the related European Patent Application No. 18168150.3.

(Continued)

*Primary Examiner* — Michael D Jennings
(74) *Attorney, Agent, or Firm* — McDermott Will & Emery LLP

(57) ABSTRACT

An electric toothbrush according to the present disclosure includes: a shaft to which a brush is attached; a primary drive unit that operates the shaft to let the brush perform a cleaning motion; and a supplementary drive unit that enables the shaft to move eccentrically. Accordingly, the electric toothbrush can facilitate entry of bristles of the brush between teeth and improve performance of cleaning between the teeth.

8 Claims, 8 Drawing Sheets

(56) References Cited

U.S. PATENT DOCUMENTS

| | | | | |
|---|---|---|---|---|
| 2007/0220689 | A1* | 9/2007 | Choi | A46B 9/04 |
| | | | | 15/22.2 |
| 2011/0041268 | A1* | 2/2011 | Iwahori | A61C 17/3481 |
| | | | | 15/22.1 |
| 2012/0011667 | A1* | 1/2012 | Kressner | A61C 17/3472 |
| | | | | 15/22.4 |
| 2014/0026337 | A1* | 1/2014 | Utsch | A61C 17/222 |
| | | | | 15/22.1 |
| 2014/0259474 | A1* | 9/2014 | Sokol | A61C 17/0202 |
| | | | | 15/22.2 |
| 2017/0007384 | A1* | 1/2017 | Wagner | A61C 17/3409 |

OTHER PUBLICATIONS

The Extended European Search Report dated Feb. 26, 2020 for the related European Patent Application No. 18168150.3.

\* cited by examiner

ELECTRIC TOOTHBRUSH

RELATED APPLICATIONS

This application claims the benefit of Japanese Application No. 2017-098740, filed on May 18, 2017, the entire disclosure of which Application is incorporated by reference herein.

BACKGROUND

1. Technical Field

The present disclosure relates to an electric toothbrush.

2. Description of the Related Art

Japanese Patent No. 4218413 presents an electric toothbrush that allows one shaft to perform two simultaneous motions, that is, a reciprocating movement along an axis and a rolling reciprocating movement around the axis. This in turn enables a brush connected to the shaft to perform two simultaneous motions, that is, a reciprocating movement along an axis and a rolling reciprocating movement around the axis.

SUMMARY

Even if the brush performs the two simultaneous motions of the reciprocating movement along the axis and the rolling reciprocating movement around the axis, the entry of bristles of the brush into the space between teeth may be inadequate and this may result in inadequate cleaning between the teeth.

It is an object of the present disclosure to provide an electric toothbrush that facilitates entry of bristles of a brush between teeth and thus improves performance of cleaning between the teeth.

Accomplished to meet the object described above, an electric toothbrush according to an aspect of the present disclosure includes: a shaft to which a brush is attached; a primary drive unit that operates the shaft to let the brush perform a cleaning motion; and a supplementary drive unit that enables the shaft to move eccentrically.

The electric toothbrush according to the aspect of the present disclosure can facilitate entry of bristles of the brush between teeth and improve performance of cleaning between the teeth.

DETAILED DESCRIPTION

Electric toothbrushes according to exemplary embodiments of the present disclosure will now be described in detail with reference to the attached drawings. It is to be noted that the exemplary embodiments to be described below are all intended to give a preferred specific example of the present disclosure. Therefore, numeric values, shapes, materials, components, dispositions and connection modes of the components, and the like, which are shown in the following exemplary embodiments, are merely examples, and are not intended to limit the present disclosure. Accordingly, among the components in the following exemplary embodiments, components which are not recited in the independent claim for the most generic concept are described as arbitrary components.

The drawings are considered schematic views which are not necessarily shown in a rigorous manner. In the respective drawings, identical components are denoted by identical reference marks.

[Electric Toothbrush]

Figure 1:
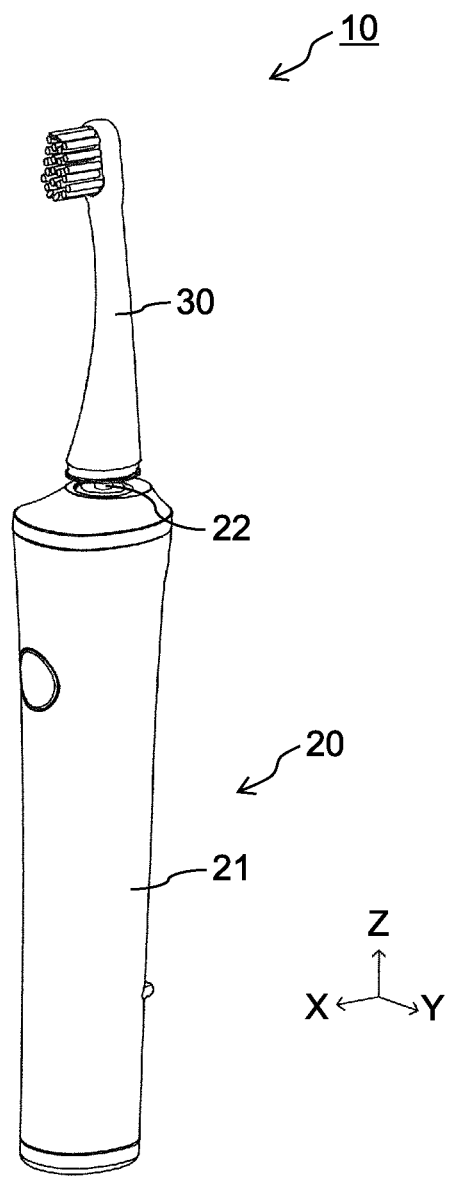
FIG. 1 is a schematic perspective view illustrating an example configuration of an electric toothbrush according to an exemplary embodiment of the present disclosure.
Figure 2:
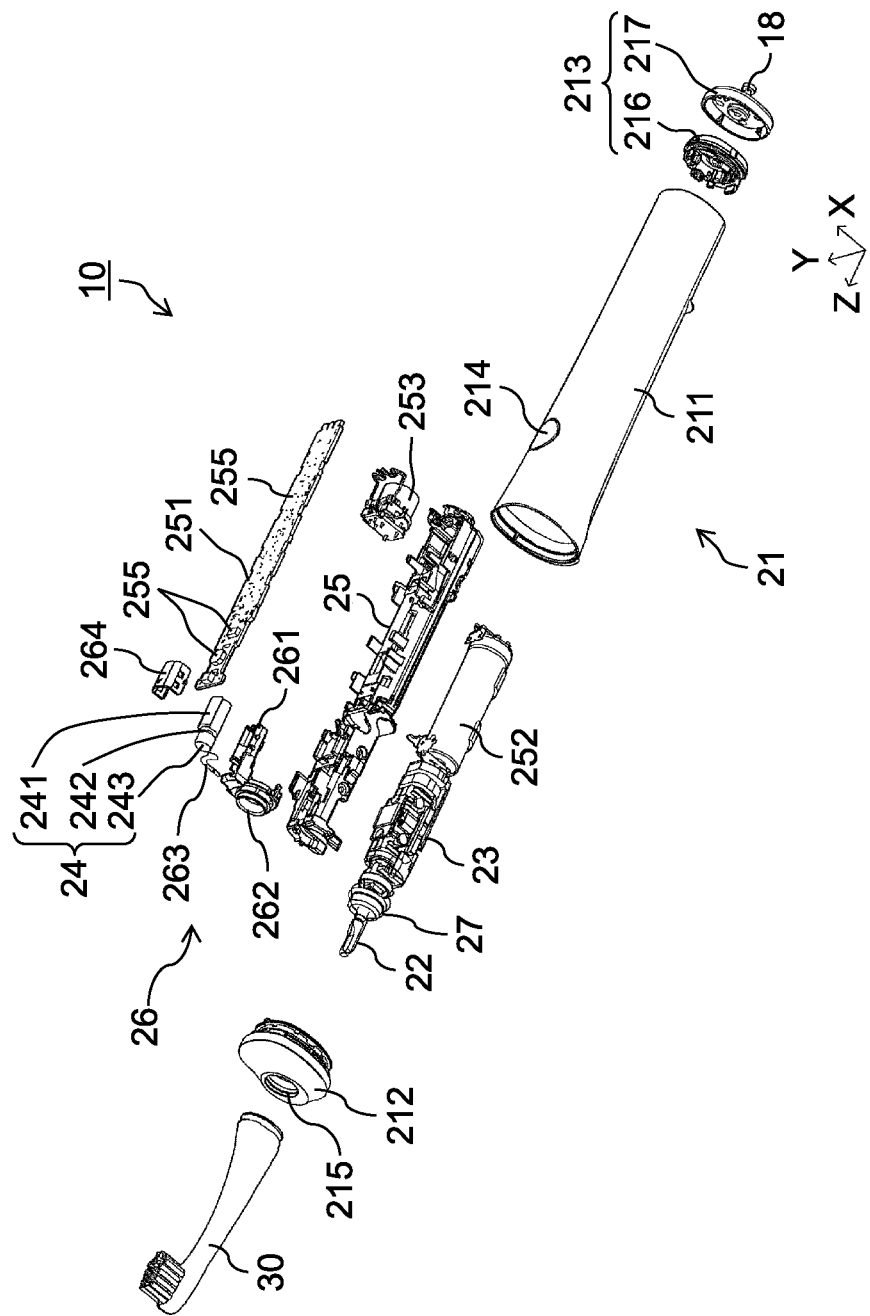
FIG. 2 is a schematic exploded perspective view illustrating an example configuration of the electric toothbrush according to the exemplary embodiment.

Firstly, electric toothbrush 10 according to an exemplary embodiment of the present disclosure will be described. FIG. 1 is a schematic perspective view illustrating an example configuration of electric toothbrush 10 according to the exemplary embodiment. FIG. 2 is a schematic exploded perspective view illustrating an example configuration of electric toothbrush 10 according to the exemplary embodiment. In the description herein, a z-axis is equivalent to a longitudinal direction of shaft 22 included in electric toothbrush 10. An x-axis is equivalent to a direction which is perpendicular to the z-axis and in which bristles of brush 30 included in electric toothbrush 10 extend. A y-axis is equivalent to a direction perpendicular to both the z-axis and the x-axis. In some usage modes, the z-axis is presumably not equal to a top-and-bottom direction. However, in the following description, the z-axis is defined as a top-and-bottom direction for explanatory convenience.

With reference to FIGS. 1 and 2, electric toothbrush 10 includes main body 20 and brush 30 replaceably attached to main body 20.

Main body 20 includes housing 21, shaft 22, primary drive unit 23, supplementary drive unit 24, first holder 25, second holder 26, and cap 27.

Housing 21 is a container that houses shaft 22, primary drive unit 23, supplementary drive unit 24, first holder 25, second holder 26, and cap 27. Specifically, housing 21 includes main casing 211 that is tubular and held by a user, lid 212 to close an upper end of main casing 211, and base 213 to close a lower end of main casing 211.

Main casing 211 is a cylinder extending longitudinally along a top-and-bottom direction and having operation button 214 on an outer peripheral surface of main casing 211. Lid 212 has opening 215 through which shaft 22 protrudes outward while lid 212 is put on the upper end of main casing 211. Base 213 includes base cover 216 and base lid 217 laminated on base cover 216 from outside. These components are fastened to the lower end of main casing 211 with screw 18.

Shaft 22 is a longitudinal shaft to which brush 30 is attached detachably. Specifically, brush 30 is attached to an upper end of shaft 22. A lower end of shaft 22 is coupled to primary drive unit 23. This configuration enables transmission of motive power generated from primary drive unit 23 to brush 30 via shaft 22.

Primary drive unit 23 is a drive unit that operates shaft 22 to let brush 30 perform a cleaning motion. Specifically, primary drive unit 23 is a linear actuator that enables shaft 22 to reciprocate linearly along an axis (the z-axis). In other words, operation by primary drive unit 23 causes shaft 22 to reciprocate linearly, and this in turn causes brush 30 to reciprocate linearly. For example, primary drive unit 23 causes shaft 22 to reciprocate linearly at a frequency of several hundred hertz (Hz) with an amplitude of several millimeters (mm). In one example, primary drive unit 23 causes shaft 22 to reciprocate linearly at a frequency of 260 Hz with an amplitude of 1.1 mm. Primary drive unit 23 is held by first holder 25.

Figure 3:
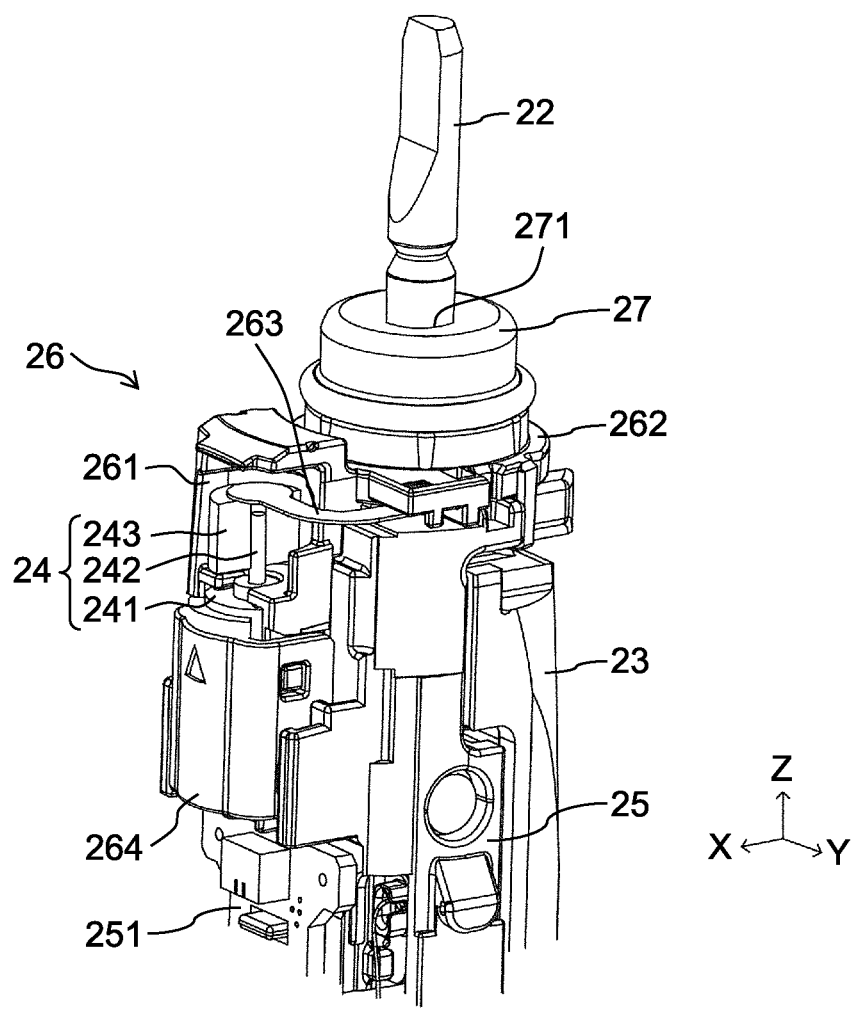
FIG. 3 is an enlarged perspective view illustrating an example configuration of a supplementary drive unit and nearby parts according to the exemplary embodiment.

Supplementary drive unit 24 will now be described. FIG. 3 is an enlarged perspective view illustrating an example configuration of supplementary drive unit 24 and nearby parts according to the exemplary embodiment.

With reference to FIGS. 2 and 3, supplementary drive unit 24 is a drive unit that enables shaft 22 to move eccentrically. Specifically, supplementary drive unit 24 is a weight-equipped rotary motor and includes main part 241, spindle 242, and weight 243. Weight 243 is fixed to spindle 242 such that weight 243 is disposed off-center relative to spindle 242 projecting from main part 241. Supplementary drive unit 24 operates at a frequency that is lower than or equal to one-half of a frequency at which primary drive unit 23 operates. In one example, primary drive unit 23 operates at a frequency of 260 Hz, whereas supplementary drive unit 24 operates at a frequency of 100 Hz. Supplementary drive unit 24 is held by second holder 26. In other words, supplementary drive unit 24 rotates weight 243 via spindle 242 and thereby causes second holder 26 to vibrate. Because of this vibration, shaft 22 swings along an xy-plane. A swinging movement of shaft 22 will be described later.

With reference to FIG. 2, first holder 25 is a chassis that holds primary drive unit 23. First holder 25 is a component extending longitudinally along the z-axis and holding parts such as second holder 26, circuit board 251, rechargeable battery 252, and power receiving coil 253 in addition to primary drive unit 23. Second holder 26 is disposed at an upper end of first holder 25. Supplementary drive unit 24 held by second holder 26 is disposed at a positive side relative to first holder 25 in the x-axis. At first holder 25, circuit board 251 is arranged side by side with supplementary drive unit 24 on the lower side of supplementary drive unit 24. Meanwhile, primary drive unit 23, rechargeable battery 252, and power receiving coil 253 are arranged in the order from top to bottom at a negative side with respect to first holder 25 in the x-axis. In other words, in a view along an axis of shaft 22 coupled to primary drive unit 23, supplementary drive unit 24 and circuit board 251 are disposed at an identical side (at a positive side in the x-axis) with respect to primary drive unit 23. In a view along the axis of shaft 22 coupled to primary drive unit 23, primary drive unit 23, rechargeable battery 252, and power receiving coil 253 are disposed at a negative side in the x-axis with respect to primary drive unit 23. Primary drive unit 23 is fastened to first holder 25 with a fastener such as a screw, for example. This prevents the occurrence of a relative positional discrepancy between primary drive unit 23 and first holder 25.

Circuit board 251 is populated with a plurality of circuit components 255 to drive primary drive unit 23 and supplementary drive unit 24. The plurality of circuit components 255 include a switching element. This switching element is configured to toggle between power supply on and off and send control signals to other circuit components 255 in response to a press of operation button 214 on main casing 211. The plurality of circuit components 255 can be designed to form respective control circuits for primary drive unit 23 and supplementary drive unit 24. In this case, these control circuits can independently control primary drive unit 23 and supplementary drive unit 24.

Power receiving coil 253 receives energy from an external power supply coil (not shown) through electromagnetic induction with the external power supply coil and puts received energy into rechargeable battery 252. This enables rechargeable battery 252 to store electricity.

Figure 4:
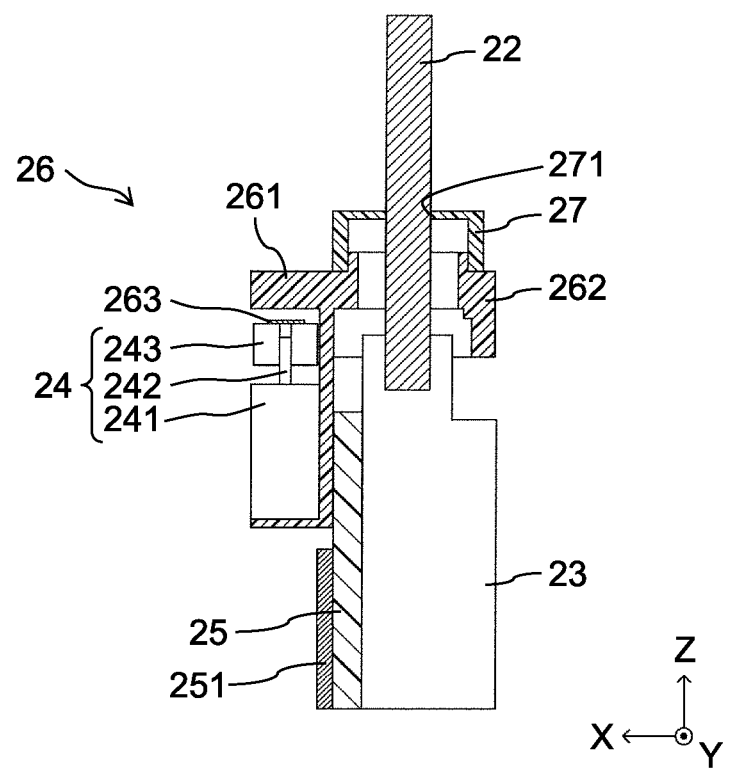
FIG. 4 is a schematic cross-sectional view illustrating an example positional relationship between a second holder and components near the second holder according to the exemplary embodiment.

Second holder 26 will now be described. FIG. 4 is a schematic cross-sectional view illustrating an example positional relationship between second holder 26 and components near second holder 26 according to the exemplary embodiment. In FIG. 4, no cross-sectional view of primary drive unit 23 and supplementary drive unit 24 is illustrated.

With reference to FIGS. 3 and 4, second holder 26 is a support holding supplementary drive unit 24 and engaging with first holder 25. Specifically, second holder 26 is a component distinct from first holder 25. Second holder 26 includes holding part 261, engaging part 262, retainer 263, and cover 264.

Holding part 261 holds supplementary drive unit 24. Holding part 261 is a boxy component that is partly open. Specifically, holding part 261 holds supplementary drive unit 24 such that spindle 242 of supplementary drive unit 24 is parallel to a direction (the z-axis) in which primary drive unit 23 lets the shaft reciprocate linearly. Holding part 261 holds weight 243 inside such that weight 243 is disposed in an upper side of supplementary drive unit 24. Since supplementary drive unit 24 is held inside holding part 261, supplementary drive unit 24 is disposed nearer to a top end (an upper end) of shaft 22 than primary drive unit 23 is. In other words, supplementary drive unit 24 is disposed nearer to brush 30 than primary drive unit 23 is. Distance between primary drive unit 23 and brush 30 and distance between supplementary drive unit 24 and brush 30 may be determined with respect to respective upper end positions of primary drive unit 23 and supplementary drive unit 24. The distance between primary drive unit 23 and brush 30 and the distance between supplementary drive unit 24 and brush 30 may be determined with respect to respective centers of gravity of primary drive unit 23 and supplementary drive unit 24.

Engaging part 262 is coupled to an upper end of holding part 261. Engaging part 262 extends toward the negative side of the x-axis so as to engage with the upper end of first holder 25. Engaging part 262 is annular in a view along the z-axis. Shaft 22 is inserted through engaging part 262. Engaging part 262 and holding part 261 engage with the upper end of first holder 25.

Retainer 263 is a metallic plate member designed to press weight 243 of supplementary drive unit 24 along an axis of supplementary drive unit 24. Specifically, retainer 263 is a substantially L-shaped component in a plane view. One end of retainer 263 is fixed to engaging part 262, whereas another end (a top end) of retainer 263 presses weight 243 toward main part 241.

Cover 264 is a component put over a part of supplementary drive unit 24 that is exposed from holding part 261 while supplementary drive unit 24 is held in holding part 261. Specifically, cover 264 is put over an outer peripheral surface of main part 241 of supplementary drive unit 24.

Cap 27 is an elastic member that couples shaft 22 to second holder 26. Specifically, cap 27 is a cup-shaped component made from rubber, for example. Through hole 271 is formed in a center of cap 27. Shaft 22 is inserted through and fitted in through hole 271 of cap 27. This keeps cap 27 in close contact with shaft 22 in entire circumference and maintains water tightness. An end of cap 27 remote from through hole 271 is fitted on engaging part 262 of second holder 26. This keeps cap 27 in close contact with engaging part 262 in entire circumference and maintains water tightness. Cap 27, an elastic member, is transformed in conjunction with linear reciprocation of shaft 22. This configuration continues the water tightness described above.

Operation

Operation of electric toothbrush 10 will now be described.

When operation button 214 is pressed by a user, circuit components 255 on circuit board 251 start operating primary drive unit 23 and supplementary drive unit 24. The operation by primary drive unit 23 gets shaft 22 to reciprocate linearly along the z-axis and thereby gets brush 30 to reciprocate in the same manner. This configuration enables brush 30 to perform a cleaning motion, that is, a linear reciprocating movement along the z-axis.

Figure 5:
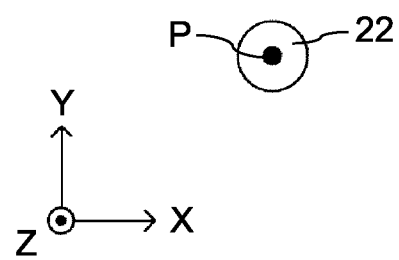
FIG. 5 illustrates an example position of a shaft in a view along a z-axis without operation of the supplementary drive unit.

FIG. 5 illustrates an example position of shaft 22 in a view along the z-axis without operation of supplementary drive unit 24. As shown in FIG. 5, if primary drive unit 23 only operates without operation of supplementary drive unit 24, shaft 22 reciprocates linearly along the z-axis without deviation from reference position P in a view along the z-axis. In other words, brush 30 attached to shaft 22 does not virtually move along any of the x-axis and y-axis but cleans tooth surfaces through a linear reciprocating movement.

However, in reality, supplementary drive unit 24 operates together with primary drive unit 23. Second holder 26 vibrates by rotation of weight 243 of supplementary drive unit 24. The vibration of second holder 26 is transmitted to shaft 22 via cap 27. Accordingly, owing to interposition of cap 27 made of an elastic member in a middle of transmission, the vibration of second holder 26 is amplified and transmitted to shaft 22.

Figure 6:
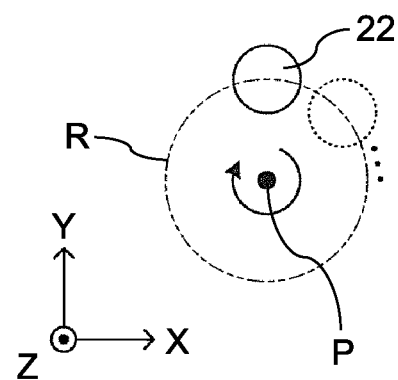
FIG. 6 illustrates an example position of the shaft in a view along the z-axis with operation of the supplementary drive unit.

FIG. 6 illustrates an example position of shaft 22 in a view along the z-axis with operation of supplementary drive unit 24. As shown in FIG. 6, vibration arising from supplementary drive unit 24 causes shaft 22 to move eccentrically relative to reference position P. Specifically, shaft 22 reciprocates lineally along the z-axis while revolving about reference position P to follow track R. In this case, in a similar manner with shaft 22, brush 30 attached to shaft 22 moves along the x-axis and the y-axis as well. Together with the movement of brush 30 along the x-axis, bristles of brush 30 move in the longitudinal direction of the bristles. Thus, the bristles enter between teeth during the cleaning motion of brush 30. The movement of brush 30 along the y-axis means that brush 30 can clean tooth surfaces by moving along the z-axis and y-axis. This increases an area cleaned by brush 30.

Effects

As described above, electric toothbrush 10 according to the exemplary embodiment includes shaft 22 to which brush 30 is attached, primary drive unit 23 that operates shaft 22 to let brush 30 perform a cleaning motion, and supplementary drive unit 24 that enables shaft 22 to move eccentrically.

This configuration enables primary drive unit 23 and supplementary drive unit 24 to operate simultaneously and thus causes shaft 22 to move eccentrically while letting brush 30 perform a cleaning motion. In other words, shaft 22 allows brush 30 to move in a direction (the longitudinal direction of bristles of brush 30 in this example: the x-axis) different from and in addition to a direction in which brush 30 perform a cleaning motion. This facilitates the entry of bristles of brush 30 between teeth. This in turn improves the performance of cleaning between teeth.

Primary drive unit 23 and supplementary drive unit 24 are separate driving sources. Thus, primary drive unit 23 and supplementary drive unit 24 can be independently controlled. In other words, control circuits can control a motion pattern for primary drive unit 23 and a motion pattern for supplementary drive unit 24 individually and thus a more complicated motion pattern can be implemented by combining these patterns. This configuration can provide motion patterns that suit various user tastes.

Supplementary drive unit 24 is a weight-equipped rotary motor.

Since supplementary drive unit 24 is a weight-equipped rotary motor, supplementary drive unit 24 enables shaft 22 to vibrate in more directions than any linear vibration motor does. As a result, the bristles of brush 30 can make a complicated movement during the cleaning motion of brush 30. This results in a further improvement in the performance of cleaning.

It is possible to use an ultrasonic motor as supplementary drive unit 24, for example. However, since the amplitude produced by the ultrasonic motor is low, the electric toothbrush is unable to facilitate the entry of bristles of brush 30 between teeth. Thus, supplementary drive unit 24 is preferably a weight-equipped rotary motor rather than an ultrasonic motor because the weight-equipped rotary motor produces higher amplitude than the ultrasonic motor does. Primary drive unit 23 is a linear actuator that enables shaft 22 to reciprocate linearly.

It is possible to use a rotary motor as primary drive unit 23, for example. This, however, necessitates the installation of a conversion mechanism inside electric toothbrush 10 to convert rotation from the rotary motor to linear reciprocation. Thus, this is inappropriate because of the complexity of the conversion mechanism, an increase in installation space, and slower motion by the conversion mechanism than that by the linear actuator.

It is also possible to use an ultrasonic transducer as primary drive unit 23, for example. However, the amplitude produced by the ultrasonic transducer is too low compared to the amplitude produced by the linear actuator. In reality, linear reciprocation actuated by the ultrasonic transducer barely brings a real sense of imp act.

If primary drive unit 23 is a linear actuator as described above, a single piece of the linear actuator can implement high-speed linear reciprocation that brings a real sense of impact and provide space savings. In other words, primary drive unit 23 can provide high-speed linear reciprocation that brings a real sense of impact while offering improved compatibility with supplementary drive unit 24.

The weight-equipped rotary motor is disposed nearer to brush 30 than the linear actuator is.

Since the weight-equipped rotary motor is disposed nearer to brush 30 than the linear actuator is, the weight-equipped rotary motor readily transmits vibration arising from the weight-equipped rotary motor to shaft 22 during the cleaning motion of brush 30. This configuration increases the amount of off-center movement of shaft 22 and facilitates the entry of bristles of brush 30 between teeth.

Spindle 242 of the weight-equipped rotary motor is disposed in parallel to a linear reciprocation made by the linear actuator.

Since spindle 242 of the weight-equipped rotary motor is disposed in parallel to a linear reciprocation made by the linear actuator, the weight-equipped rotary motor enables shaft 22 to move eccentrically such that shaft 22 revolves about reference position P. This configuration enables brush 30 attached to shaft 22 to move along the x-axis and the y-axis as well. Together with the movement of brush 30 along the x-axis, bristles of brush 30 move in the longitudinal direction of the bristles. Thus, the bristles enter between teeth during the cleaning motion of brush 30. The movement of brush 30 along the y-axis means that brush 30 can clean tooth surfaces by moving along the z-axis and y-axis. This increases an area cleaned by brush 30.

The layout as described above also allows a well-balanced disposition of the weight-equipped rotary motor inside electric toothbrush 10 and contributes to an improvement in design flexibility.

Electric toothbrush 10 further includes retainer 263 to press weight 243 of the weight-equipped rotary motor along the axis of the weight-equipped rotary motor.

In some cases, the weight-equipped rotary motor has backlash along its axis. As a result, if the direction in which the linear actuator lets the shaft reciprocate linearly is parallel to the axis of the weight-equipped rotary motor, linear reciprocation by the linear actuator is liable to generate an unusual noise resulting from the axial backlash of the weight-equipped rotary motor. Nevertheless, retainer 263 that presses weight 243 along the axis of the weight-equipped rotary motor suppresses the axial backlash of the weight-equipped rotary motor and thus suppresses the occurrence of an unusual noise resulting from the axial backlash of the weight-equipped rotary motor.

Electric toothbrush 10 further includes circuit board 251 populated with circuit components 255 to drive primary drive unit 23 and supplementary drive unit 24. In a view along the axis of shaft 22, the weight-equipped rotary motor and circuit board 251 are disposed on one side with respect to the linear actuator.

Since the weight-equipped rotary motor and circuit board 251 are disposed on one side with respect to the linear actuator in a view along the axis of shaft 22, the weight-equipped rotary motor and circuit board 251 can be disposed adjacent to each other. Thus, wiring can be readily installed between the weight-equipped rotary motor and circuit board 251.

The weight-equipped rotary motor operates at a frequency that is lower than or equal to one-half of a frequency at which the linear actuator operates.

Since the weight-equipped rotary motor operates at a frequency that is lower than or equal to one-half of a frequency at which the linear actuator operates, these frequencies are hindered from relatively having phases opposite to each other. This configuration prevents vibration owing to rotation made by the weight-equipped rotary motor from being canceled out by vibration owing to linear reciprocation made by the linear actuator.

The weight-equipped rotary motor and the linear actuator operate at respective frequencies that differ from each other. Thus, the electric toothbrush can readily give an impression of the workings of different drives and bring a real sense of impact.

Electric toothbrush 10 further includes first holder 25 to hold primary drive unit 23 and second holder 26 to hold supplementary drive unit 24. First holder 25 and second holder 26 are distinct components.

Supplementary drive unit 24 can increase the vibration of an object as the weight of the object is reduced. Thus, if second holder 26 is a component distinct from first holder 25, weight of second holder 26, an object vibrated by supplementary drive unit 24, can be readily reduced. In other words, a reduction in the weight of second holder 26 increases the vibration transmitted from supplementary drive unit 24 to second holder 26 and consequently improves cleaning capacity of brush 30.

Electric toothbrush 10 further includes an elastic member (cap 27) that couples shaft 22 to second holder 26.

Since the elastic member couples shaft 22 to second holder 26, the elastic member is interposed in a course of transmission. As a result, the vibration of second holder 26 is amplified by the elastic member and transmitted to shaft 22. This improves cleaning capacity.

First Modification

In the exemplary embodiment described above, the weight-equipped rotary motor and circuit board 251 are disposed on one side with respect to the linear actuator in a view along the axis of shaft 22, for example. In a first modification, another layout example is described.

Figure 7:
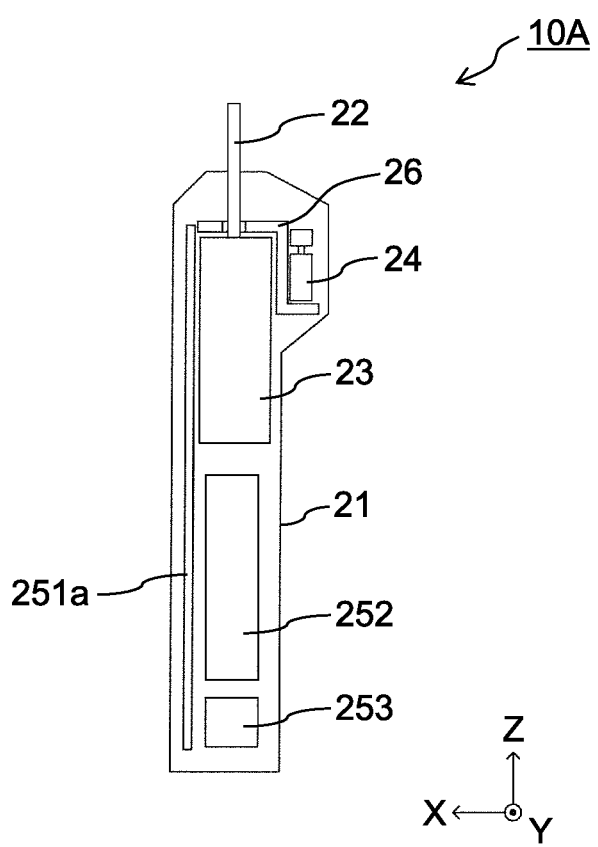
FIG. 7 is a schematic view illustrating an example configuration of an electric toothbrush according to a first modification of the present disclosure.

FIG. 7 is a schematic view illustrating an example configuration of electric toothbrush 10A according to the first modification. In the following description, parts identical to those of the above exemplary embodiment are assigned with the identical reference numerals, and descriptions thereof may be omitted.

With reference to FIG. 7, in electric toothbrush 10A according to the first modification, a weight-equipped rotary motor (supplementary drive unit 24) and circuit board 251a are disposed opposing each other across a linear actuator (primary drive unit 23) relatively in a view along an axis of shaft 22. In other words, in a view along the axis of shaft 22, circuit board 251a is disposed opposing the weight-equipped rotary motor across the linear actuator.

This configuration contributes to an increase in installation space for circuit board 251a and thus to an increase in size of circuit board 251a. This can increase a number of installed circuit components and layout flexibility, resulting in improved usability.

Second Modification

In the exemplary embodiment described above, the spindle of the weight-equipped rotary motor is disposed in parallel to a linear reciprocation made by the linear actuator, for example. In a second modification, another layout example is described.

Figure 8:
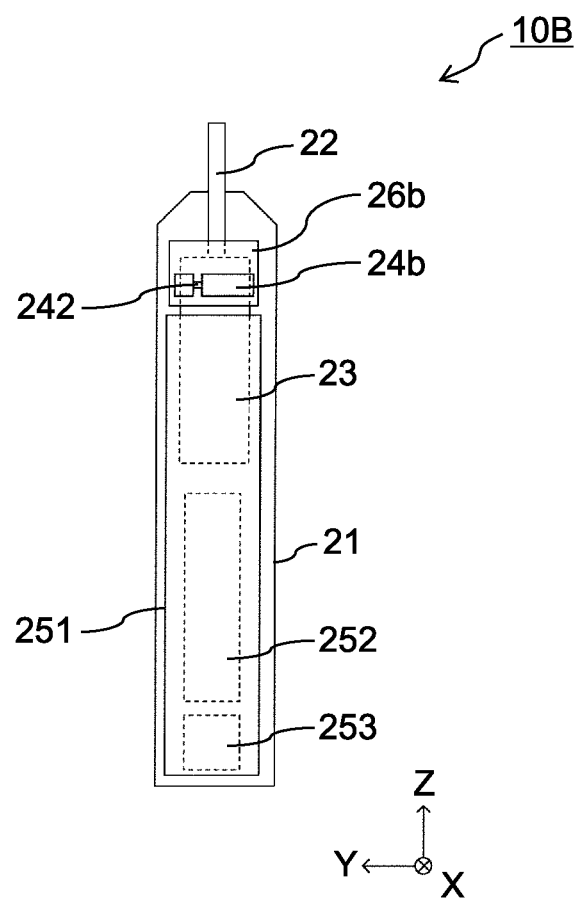
FIG. 8 is a schematic view illustrating an example configuration of an electric toothbrush according to a second modification of the present disclosure.

FIG. 8 is a schematic view illustrating an example configuration of electric toothbrush 10B according to the second modification. In the following description, parts identical to those of the above exemplary embodiment are assigned with the identical reference numerals, and descriptions thereof may be omitted.

With reference to FIG. 8, in electric toothbrush 10B according to the second modification, spindle 242 of a weight-equipped rotary motor (supplementary drive unit 24b) is disposed so as to intersect with a linear reciprocation made by a linear actuator (primary drive unit 23). Specifically, the weight-equipped rotary motor is held by second holder 26b such that spindle 242 is parallel to a xy-plane. As a result, spindle 242 is at right angles to the linear reciprocation made by the linear actuator.

As described above, if the direction in which the linear actuator lets the shaft reciprocate linearly is parallel to the axis of the weight-equipped rotary motor, linear reciprocation by the linear actuator is liable to generate an unusual noise resulting from the axial backlash of the weight-equipped rotary motor. Nevertheless, spindle 242 of the weight-equipped rotary motor is at right angles to the linear reciprocation made by the linear actuator and thus suppresses the occurrence of an unusual noise resulting from the axial backlash of the weight-equipped rotary motor. This configuration without retainer 263 can suppress unusual noises.

In the second modification, spindle 242 is at right angles to the linear reciprocation made by the linear actuator, for example. Spindle 242 may form any angle with the linear reciprocation made by the linear actuator, with proviso that spindle 242 and the linear reciprocation intersect with each other. This non-right angle intersection can suppress the occurrence of an unusual noise resulting from the axial backlash of the weight-equipped rotary motor because spindle 242 is not parallel to the linear reciprocation made by the linear actuator. However, if spindle 242 of the weight-equipped rotary motor is at right angles to the linear reciprocation made by the linear actuator, the electric toothbrush can produce an enhanced effect in suppressing unusual noises.

Third Modification

In the exemplary embodiment described above, retainer 263 is a metallic plate member, for example. Retainer 263 made of metal can bring about a situation in which rotation of weight 243 results in friction between metals. A third modification designed to avoid this situation is described below. In this example, a portion of the retainer that comes into contact with weight 243 is a resin molding.

Figure 9:
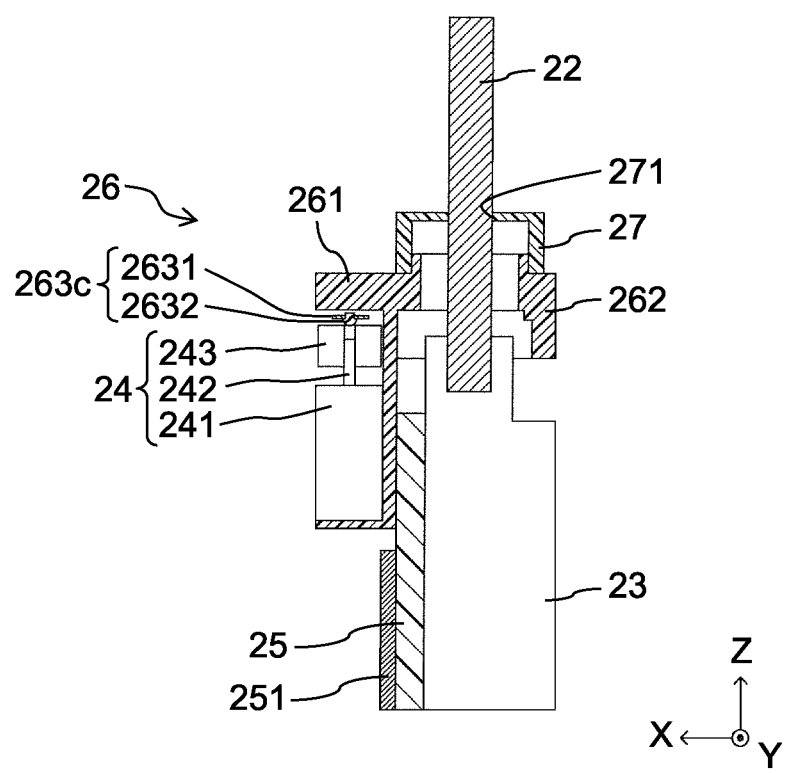
FIG. 9 is a schematic cross-sectional view illustrating an example configuration of a retainer according to a third modification of the present disclosure.

FIG. 9 is a schematic cross-sectional view illustrating an example configuration of retainer 263c according to the third modification. With reference to FIG. 9, retainer 263c includes plate member 2631 made of metal and contact part 2632 made of resin. Specifically, contact part 2632 is attached to a top end of plate member 2631. A lower end of contact part 2632 forms a hemispherical protrusion. If the lower end of contact part 2632 is brought into contact with weight 243, plate member 2631 is warped. Since restoring force of plate member 2631 is transmitted to weight 243 via contact part 2632, weight 243 is pressed toward main part 241. In retainer 263c according to the third modification, contact part 2632 that comes into contact with weight 243 is made of resin, and thus this configuration prevents metal-to-metal friction between retainer 263 and weight 243.

The retainer may be made of any material other than the plate member with proviso that the material can press the weight axially. Examples of other materials include springs and cushions.

Others

The electric toothbrushes according to the above exemplary embodiment, as well as the first, second, and third modifications of the present disclosure have been described. However, the scope of the present disclosure should not be limited to the above exemplary embodiment and the first, second, and third modifications.

In the exemplary embodiment described above, primary drive unit 23 is a linear actuator, for example. However, primary drive unit 23 may be any other actuator with proviso that the actuator operates shaft 22 to let brush 30 perform a cleaning motion. Cleaning motions performed by brush 30 except the linear reciprocation described above include rolling movement for enabling the brush to revolve on the axis of shaft 22, turning movement for enabling the bristles to turn round a head of brush 30, and ultrasonic movement for vibrating the bristles by ultrasonic waves. The primary drive unit may be an actuator that can implement any of these movements. Examples of the primary drive unit other than the linear actuator include motors such as sound wave motors and ultrasonic motors. The primary drive unit may be a single actuator that can implement a plurality of movements.

In the exemplary embodiment described above, supplementary drive unit 24 is a weight-equipped rotary motor, for example. However, supplementary drive unit 24 may be any other motor with proviso that the motor enables shaft 22 to move eccentrically. Examples of other motors include linear vibration motors.

In the exemplary embodiment described above, primary drive unit 23 and supplementary drive unit 24 operate simultaneously, for example. However, the electric toothbrush may allow switching between a mode in which only primary drive unit 23 operates and a mode in which primary drive unit 23 and supplementary drive unit 24 operate simultaneously, for example.

The scope of the present disclosure should include modifications that those skilled in the art can obtain by adding various design changes to the exemplary embodiments described above, as well as modifications implemented by freely combining components and functions described in the exemplary embodiments without deviating from the gist of the present disclosure.

The present disclosure is applicable to an electric toothbrush equipped with a replaceable brush.

What is claimed is:

1. An electric toothbrush comprising:
   a shaft to which a brush is attached;
   a primary drive unit that operates the shaft to let the brush perform a cleaning motion; and
   a supplementary drive unit that enables the shaft to move eccentrically, wherein:
   the supplementary drive unit includes a weight-equipped rotary motor,
   the primary drive unit include a linear actuator that enables the shaft to reciprocate linearly, and
   a spindle of the weight-equipped rotary motor is disposed in parallel to a linear reciprocation made by the linear actuator.

2. The electric toothbrush according to claim 1, wherein the weight-equipped rotary motor is nearer to the brush than the linear actuator is.

3. The electric toothbrush according to claim 1, further comprising a retainer to press a weight of the weight-equipped rotary motor along an axis of the weight-equipped rotary motor.

4. The electric toothbrush according to claim 1, further comprising a circuit board populated with a circuit component to drive the linier actuator and the weight-equipped rotary motor,
   wherein in a view along an axis of the shaft, the weight-equipped rotary motor and the circuit board are disposed on one side with respect to the linear actuator.

5. The electric toothbrush according to claim 1, further comprising a circuit board populated with a circuit component to drive the linier actuator and the weight-equipped rotary motor,
   wherein in a view along an axis of the shaft, the weight-equipped rotary motor and the circuit board are disposed opposing each other across the linear actuator.

6. The electric toothbrush according to claim 1, wherein the weight-equipped rotary motor operates at a frequency that is lower than or equal to one-half of a frequency at which the linear actuator operates.

7. The electric toothbrush according to claim 1, further comprising:
   a first holder to hold the primary drive unit; and
   a second holder to hold the supplementary drive unit,
   wherein the first holder and the second holder are distinct components.

8. The electric toothbrush according to claim 7, further comprising an elastic member that couples the shaft to the second holder.

* * * * *